UNITED STATES PATENT OFFICE.

HERMAN MILANOFF, OF CHICAGO, ILLINOIS.

STRAW-FINISHING COMPOSITION.

1,305,146.  Specification of Letters Patent.  Patented May 27, 1919.

No Drawing.  Application filed June 4, 1918. Serial No. 238,153.

*To all whom it may concern:*

Be it known that I, HERMAN MILANOFF, a citizen of the United States, residing at Chicago, in the county of Cook and State of Illinois, have invented certain new and useful Improvements in Straw - Finishing Compositions, of which the following is a specification.

This invention has as its object to provide a novel composition for finishing straw hats, particularly of the Panama variety and also imitation Panama hats, and also for finishing white canvas hats.

Another object of the invention is to provide a composition for the purpose stated which will stiffen and finish the hat in one operation, which will dry quickly and may be readily and quickly applied, and which will contain no injurious acids or other injurious compounds.

A further object of the invention is to provide a composition for the purpose stated which will adhere intimately to the hat when applied and which will not act to shrink the hat.

In the manufacture of this composition, I make use of the following ingredients in substantially the proportions stated, although it will be understood that these proportions may be varied within reasonable limits:

| | |
|---|---|
| Zinc oxid | 40 pounds. |
| Precipitated sulfur | 40 pounds. |
| Gelatin | 2½ pounds. |
| Karaya gum known in the trade as gum laconda, gum tragacanth, or any other related or suitable gum | ¼ pound. |
| Water | 2 gallons. |
| Milk, glycerin, or a suitable light oil | 1 quart. |

In the preparation of this composition, the water is heated and the gelatin is dissolved therein, and while the solution is still warm, the milk, or glycerin, or any suitable light oil is added and then the gum selected to be employed is added in the form of a solution in water.

The zinc oxid and precipitated sulfur are then added alternately and the mixture is vigorously stirred while adding these ingredients, the stirring being continued until the mixture becomes cool. When the mixture has cooled it will have the consistency of a paste and batches thereof are kneaded as in the kneading of dough so as to break up any lumps in the mixture and to insure of thorough mixture of the ingredients. In using the composition, a sponge is dampened and rubbed over the paste until a suitable quantity has been taken up, whereupon the sponge is rubbed over the hat to be finished. After the desired quantity of the composition has been applied to the hat and distributed properly it is permitted to dry and the hat is ready for wear.

Ordinarily the paste will be white or cream-white in color depending upon whether the relative quantities of zinc oxid and sulfur are increased or diminished, a preponderance of zinc oxid, of course, intensifying the white color of the paste and a preponderance, on the other hand, of the sulfur rendering the paste cream-white in color and more or less deeply so.

It will be understood that the milk or glycerin or light oil employed serves to maintain the paste consistency of the composition for a long period of time.

Having thus described the invention, what is claimed as new is:

1. A straw finishing composition comprising a mixture of zinc oxid, sulfur, and an adhesive.

2. A straw finishing composition comprising a mixture of zinc oxid, sulfur, gelatin, gum laconda, and water.

3. A straw finishing composition comprising a mixture of zinc oxid, sulfur, gelatin, gum laconda, and milk.

4. A straw finishing composition comprising a mixture of zinc oxid, sulfur, gelatin, gum laconda, water and milk in about the proportions of zinc oxid forty pounds, precipitated sulfur forty pounds, gelatin two and one-half pounds, gum laconda one-fourth pound, water two gallons, and milk one quart.

5. A straw finishing composition comprising a mixture of zinc oxid, sulfur, gelatin, an adhesive, and an ingredient for preserving the pasty consistency of the composition.

6. A straw finishing composition comprising a mixture of zinc oxid, sulfur, gelatin, an adhesive, and milk.

In testimony whereof I affix my signature.

HERMAN MILANOFF. [L. S.]

Copies of this patent may be obtained for five cents each, by addressing the "Commissioner of Patents, Washington, D. C."